July 23, 1963   W. REIHER ETAL   3,098,418
PHOTOGRAPHIC CAMERA WITH ELECTRIC MOTOR DRIVE
Filed Nov. 4, 1960   2 Sheets-Sheet 1
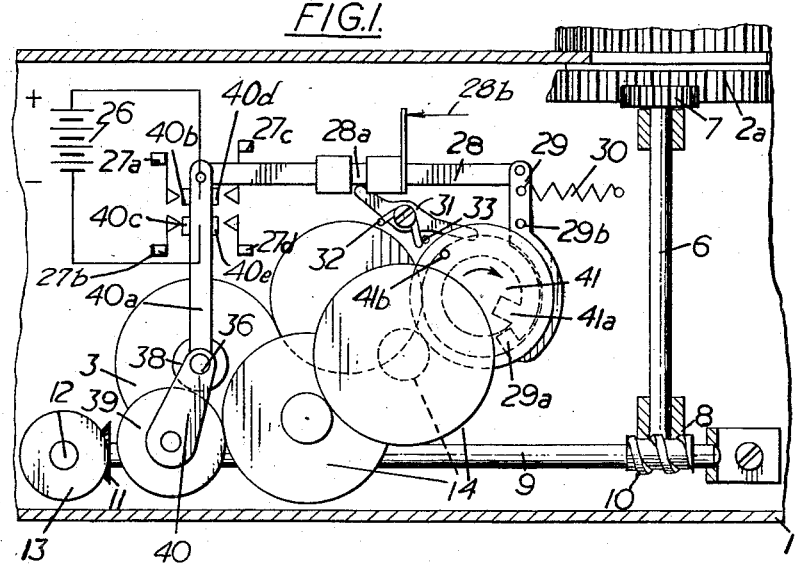
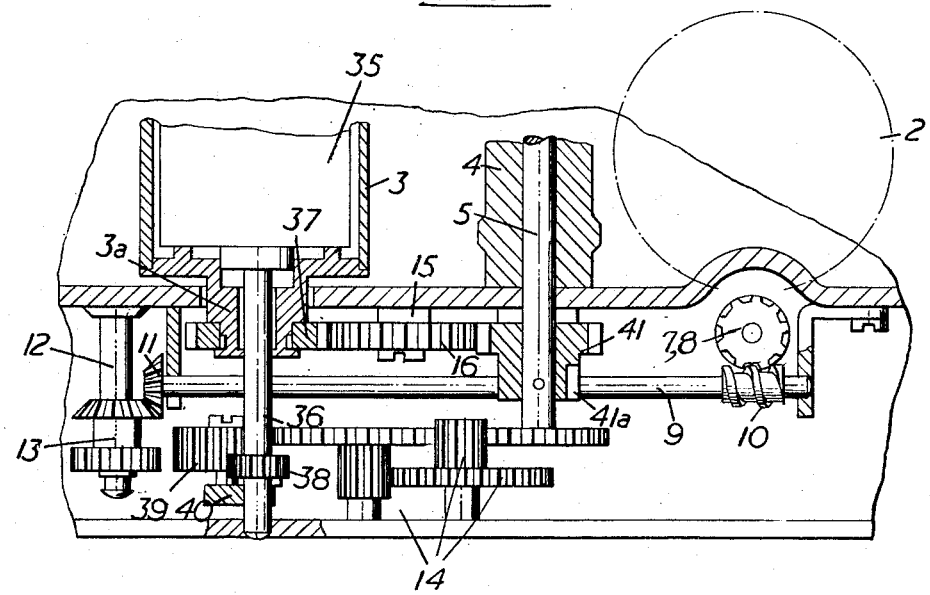
Inventors
WOLFGANG REIHER
KLAUS HINTZE
By Irwin S. Thompson
Attorney

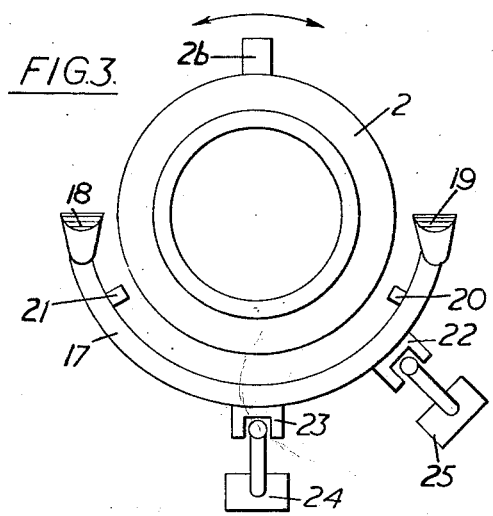
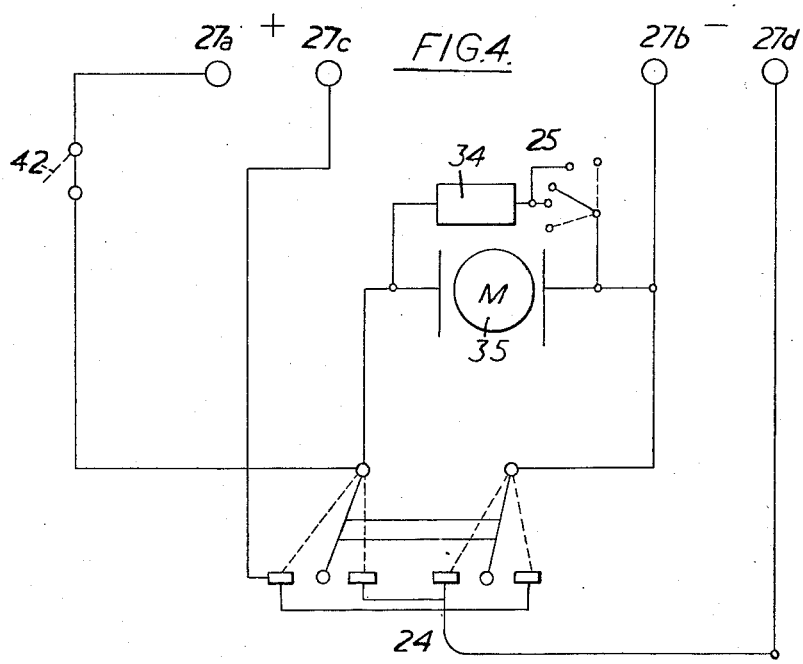

3,098,418
PHOTOGRAPHIC CAMERA WITH ELECTRIC MOTOR DRIVE

Wolfgang Reiher and Klaus Hintze, Dresden, Germany, assignors to VEB Kamera- und Kinowerke Dresden, Dresden, Germany
Filed Nov. 4, 1960, Ser. No. 67,387
11 Claims. (Cl. 95—31)

The invention relates to a photographic camera which is equipped with an electric motor provided alternatively for different functions.

Cameras are already known wherein the film winding from picture to picture and the winding back of the film are carried out by an electric motor. It is also known to effect the distance setting of the picture-taking objective lens in photographic cameras by means of electric motors.

An object of the invention is to provide a photographic camera which unites in itself an electric motor drive of the film winding and shutter cocking on the one hand and of the setting of the picture-taking objective lens on the other hand.

In accordance with the invention this problem is solved due to the fact that the electric motor housed on or in a camera housing is constantly geared by means of a drive pinion with a coupling toothed wheel which is movable between the film winding gear, shutter cocking gear and an objective lens adjusting gear and is arranged for alternate coupling therewith on a lever which is mounted for pivoting coaxially with the drive pinion on the motor shaft and on the one hand with its free lever arm forms a part of an electric change-over switch for the alternate closing and interruption of the contact connections of the electric motor and on the other hand is geared with the shutter release and a film-winding lock.

In accordance with the invention the alternate movement of the coupling toothed wheel for the uncoupling and coupling between the electric motor and film-winding and shutter arrangements on the one hand and the setting device for the picture-taking objective lens on the other hand is controlled in dependence upon the movement of the shutter release and is alternately blocked and liberated by the film-winding lock in co-operation with an operating toothed wheel. The direction of rotation of the motor is reversible according to choice here by means of a control switch included in the feed current circuit of the electric motor. Further details of the invention will be explained more closely by way of example with reference to the accompanying drawings in which:

FIGURE 1 shows a partial elevation of an opened camera with the arrangement in accordance with the invention, seen from beneath;

FIGURE 2 shows a plan view of FIGURE 1 in section;

FIGURE 3 shows the front elevation of a camera with a control switch for the objective lens setting; and FIGURE 4 shows the electric circuit diagram for the arrangement in accordance with the invention.

In a camera housing 1 there are mounted an objective lens 2, a film spool 3, a conveyor roller 4 on a shaft 5, a drive shaft 6 with a pinion 7 and a worm wheel 8, a worm shaft 9 with a worm 10 and a bevel wheel 11, a mounting bolt 12 for a combined bevel spur wheel 13, a motor reduction gearing 14, a bolt 15 with a toothed wheel 16, a bow 17 (FIG. 3) with handles 18 and 19, and noses 20 and 21 and claws 22 and 23, switches 24 and 25, a battery 26, contact pairs 27a and 27b, 27c and 27d, a push or actuating rod 28 with an annular groove 28a, a locking lever 29 rotatable about a pin 29b with a spring 30, a support lever 31 with a shank spring 32, pin 33 and a resistance 34. In the film spool 3 there is mounted an electric motor 35, the motor shaft 36 of which extends through a bore in a journal 3a of the film spool 3 which is connected in non-rotatable fashion with an intermediate wheel 37. On the motor shaft 36 there is firmly mounted a pinion 38, which is in constant gear connection with a coupling toothed wheel 39, which in turn is mounted in a bell-crank lever 40 movably mounted on the motor shaft 36. The free lever arm 40a of the bell-crank lever 40 carries contacts 40b, 40c, 40d and 40e insulated from one another, which are associated with the contact pairs 27a and 27b, and 27c and 27d respectively. Fixedly mounted on the shaft 5 of the conveyor roller 4 there is an actuating gear wheel 41 carrying an actuating pin 41b and into the untoothed collar of which there is machined a groove 41a. The locking lever 29 possesses a hook 29a, which is allocated to the groove 41a in the actuating toothed wheel 41. The objective lens assembly 2 possesses a toothed ring 2a, the teeth of which engage the teeth of the spur wheel 7. Furthermore, this ring 2a of the objective lens assembly 2 is provided with a stop 2b (FIG. 3), which is intended to cooperate with the noses 20 and 21 on the bow 17. In a between-the-lens shutter (not shown) there is arranged a switch 42 (FIG. 4) which is closed by a moved part of the shutter at the end of the running off of the shutter and is opened again at the end of the shutter cocking movement.

Upon the push rod 28 there acts a cocking and film winding release member (similarly not shown) in the direction of the arrow 28b (FIGURE 1). The operation of the arrangement is described as follows:

By the actuation of the release member in order to effect cocking and film winding the push rod 28 is shifted in the direction of the arrow 28b and in this shift moves the bell-crank lever 40, acting on the lever arm 40a about the motor shaft 36. Shortly before the end position is reached the contacts 40b and 40c strike upon the contact pair 27a and 27b (FIGURE 1), the coupling toothed wheel 39 engages with the first toothed wheel of the reduction gearing 14, the shutter is released and closes the switch 42. At the same time, the support lever 31 drops into the annular groove 28a in the push rod 28 under the action of its shank spring 32. The locking lever 29 is here rotated against the action of its spring 30 about the pin 29b and the hook 29a is lifted out of the groove 41a in the actuating toothed wheel 41. By this operation just described the gear connection of the electric motor 35 with the film spool 3 and with the conveyor roller 4 is constituted and the current circuit from the battery 26 through the contact 40b, the contact 27a, the switch 42, the motor 35, the contact 27b and the contact 40c back to the battery 26 is closed. The film is wound and the shutter cocked. During the winding and cocking movement the operating pin 41b strikes upon the support lever 31 and lifts the latter out of the blocking position opposite the push rod 28 against the action of the shank spring 32. The hook 29a places itself upon the external diameter of the untoothed collar of the operating toothed wheel 41 and prevents the disconnection of the contacts 27a—40b and 27b—40c until at the end of the winding movement it can drop into the groove 41a in the actuating toothed wheel under the action of the spring 30. When the hook 29a drops in, the spring 30 through the push rod 28 pulls on the lever arm 40a of the bell-crank lever 40, opens the contact connection 27a—40b and 27b—40c and closes the contact connection 27c—40d and 27d—40e. At the same time, by the movement of the bell-crank lever 40, the coupling toothed wheel 39 is brought out of engagement with the first toothed wheel of the reduction gearing 14 and into engagement with the combined bevel spur wheel 13. Also at the same time the already mentioned movable part of the shutter at the end of the cocking movement opens the switch 42. After the running off of these movement operations the gear connection of the electric motor 35 with the ring 2a of the objective lens assembly 2 is constituted through the coupling toothed wheel 39, the combined bevel spur wheel 13, the bevel wheel 11, the worm shaft 9, the worm 10, the worm wheel 8, the drive shaft 6 and the spur wheel 7. The battery voltage is applied to the switch 24. If now one of the handles 18, 19 is depressed, the switches 24 and 25 close, actuated by the claws 22 and 23. The current circuit is closed from the battery 26 through the contact 27c, the contact 40d, the switch 24, the motor 35, the contact 27b, the contact 40e, back to the battery 26. At the same time through the switch 25 the resistance 34 is connected parallel with the electric motor 35, so that the latter does not run with full power—that is to say only slowly—(fine setting).

If the actuated handle 18 or 19 is depressed further, the switch 25 is opened again and the electric motor 35 works with full power due to cutting out of the resistance 34 (coarse setting, FIGURES 1–4).

Towards the end of the possible adjusting movement of the ring 2a the stop 2b strikes against one of the noses 20, 21 and moves the bow 17 with the handles 18 and 19 back into its initial position. The electric motor 35 is switched off. If the other of the two handles 18, 19 is actuated, the electric motor 35 is reversed in polarity and accordingly runs in the opposite direction of rotation. The objective lens assembly 2 is shifted through the ring 2a in the manner already described, but in the opposite direction. As is presumably easily understandable, the objective lens 2 can be adjusted in this manner with the aid of the electric motor 35 into the correct position, without toilsome manual work having to be performed.

If the shutter is released again, the operation already described is repeated.

We claim:

1. In a photographic camera having a housing, a shutter device arranged in the housing, a shutter cocking mechanism operatively connected to said shutter device, an objective lens assembly carried by said housing, an objective lens setting mechanism operatively connected to said objective lens assembly, a film-winding mechanism including a film drive sprocket arranged in the housing, the provision of:

(a) a first gear mechanism arranged in the housing and drivably connected to both said shutter cocking mechanism and said film-winding mechanism, (b) a second gear mechanism drivably connected to the objective lens setting mechanism, (c) an electric motor mounted in the housing and having a driving shaft extending from said motor, (d) a pinion mounted on said shaft, (e) a lever pivotally mounted in the housing coaxial with said pinion and having two arms extending from the pivotal axis of said lever, (f) a movable actuating rod arranged in the housing, (g) one of said arms being operatively connected to said actuating rod which is thereby capable of moving said lever into each of two operative positions through an intermediate position, (h) a toothed coupling wheel in permanent mesh with said pinion, (i) said toothed coupling wheel being carried by one of said arms and being engageable alternately, on actuation of said lever, with said first gear mechanism when the lever is in one position and with said second gear mechanism when the lever is in the other position to effect a drive alternately to said shutter cocking mechanism and said film winding mechanism together and to said objective lens setting mechanism respectively, (j) electric current supply means in the housing, (k) an electric change-over switch electrically connected to said supply means, (l) said switch being operable by one of said arms to close the circuit between said electric motor and said supply means in each of said operative positions of the lever, and (m) a locking mechanism controlled by said actuating rod and engageable with said first gear mechanism for locking the latter at the end of a film-winding-on and shutter cocking operation.

2. A photographic camera according to claim 1, wherein the locking mechanism comprises a drum fixed to rotate with the film-winding mechanism, a further lever pivotally mounted in the housing, said further lever having a detent capable of engaging a recess provided in the drum to lock the latter against rotational movement at the end of a film-winding-on operation, and a spring for urging said further lever in a direction so that the detent engages the surface of the drum until the drum rotates to bring the recess adjacent the detent whereupon the latter enters the recess.

3. A photographic camera according to claim 1, wherein the locking mechanism comprises a drum fixed to rotate with the film-winding mechanism, a detent lever pivotally mounted in the housing and having a detent on one side of the pivot formed as part of said detent lever, which detent is engageable in a recess provided in the drum to lock the latter against rotational movement at the end of a film-winding operation, and a spring for urging said detent lever in a direction so that the detent engages the surface of the drum until the drum rotates to bring the recess adjacent the detent whereupon the latter enters the recess, said actuating rod being axially slidable within the housing and pivotally connected at one end to the detent lever on the other side of the pivot remote from the detent.

4. A photographic camera according to claim 3, having a second locking lever pivotally mounted in the housing, said second locking lever being engageable with a recess provided on the actuating rod to hold the latter in one axial position against the tension of said first mentioned spring, a second spring for urging said second locking lever in a direction to engage the recess on the actuating rod, and a projection on said drum for actuating said second locking lever on the completion of a film-winding operation, whereupon the second locking lever releases the actuating rod which returns to its rest position.

5. A photographic camera according to claim 1 wherein said second gear mechanism comprises a first gear wheel pivotally mounted in the housing and engageable by said toothed coupling wheel, a first bevel wheel pivotally mounted in the housing and fixed to rotate with said first gear wheel, a second bevel wheel in mesh with said first bevel wheel, and a worm drive connected between said second bevel wheel and said objective lens setting mechanism.

6. A photographic camera according to claim 1, wherein said change-over switch comprises two sets of contacts, one set being electrically joined when the two-armed lever moves into a position to effect a driving connection between the motor and the film-winding and cocking mechanisms whereupon the motor is energised, a second set of contacts being electrically connected when the two-armed lever moves into a position to effect driving connection between the motor and the objective lens setting mechanism whereupon the circuit through the motor is prepared for completion as required.

7. A photographic camera according to claim 6, having a control switch in the circuit with the electric motor and said second set of contacts, said control switch comprising a further change-over switch for reversing the current through the motor.

8. A photographic camera according to claim 6, having a control switch in the circuit with the electric motor, said control switch comprising a further change-over switch for reversing the current through the motor, a resistance coupled in parallel with the motor, and a subsidiary switch in the circuit of the resistance to render the latter alternately effective and ineffective for slow and fast running of the motor.

9. A photographic camera according to claim 6, having a control switch in the circuit with the electric motor, said control switch comprising a further change-over switch for reversing the current through the motor, a resistance coupled in parallel with the motor, a subsidiary switch in the circuit of the resistance to render the latter alternately effective and ineffective for slow and fast running of the motor, and a semi-circular bow-shaped member rotatably attached to the front of the shutter device for the control of adjustment of the objective lens aperture, which bow-shaped member is operatively connected to said control switch and said subsidiary switch.

10. A photographic camera according to claim 6, having a control switch in the circuit with the electric motor, said control switch comprising a further change-over switch for reversing the current through the motor, a resistance coupled in parallel with the motor, a subsiliary switch in the circuit of the resistance to render the latter alternately effective and ineffective for slow and fast running of the motor, a semi-circular bow-shaped member rotatably supported on the camera, and a stop member projecting from the objective lens assembly, which bow-shaped member is operatively connected to said control switch and said subsidiary switch and is provided with two noses which engage said stop member when the limits of adjustment of the lens aperture have been reached whereupon the control switch is operated to interrupt the current of the motor.

11. A photographic camera according to claim 1, including a spring-biased lever which is in engagement with a recess in said actuating rod to urge the latter in a direction in which said lever is in a position where the toothed coupling wheel is in engagement with said first gear mechanism.

References Cited in the file of this patent
UNITED STATES PATENTS

| | | |
|---|---|---|
| 2,607,265 | Petrucelli | Aug. 19, 1952 |
| 2,969,722 | Schwartz | Jan. 31, 1961 |